(12) United States Patent
Schlosser (10) Patent No.: US 7,443,067 B2
(45) Date of Patent: Oct. 28, 2008

(54) PUMP-MOTOR ASSEMBLY LEAD PROTECTOR AND ASSEMBLY METHOD

(75) Inventor: Kraig Schlosser, Columbia City, IN (US)

(73) Assignee: Franklin Electric Co., Inc., Blufton, IN (US)

( * ) Notice: Subject to any disclaimer, the term of this patent is extended or adjusted under 35 U.S.C. 154(b) by 526 days.

(21) Appl. No.: 11/121,210

(22) Filed: May 3, 2005

(65) Prior Publication Data

US 2006/0250754 A1    Nov. 9, 2006

(51) Int. Cl.
    *H02K 5/22* (2006.01)
(52) U.S. Cl. .................. 310/71; 417/360; 417/423.14; 417/423.15; 174/66; 439/536
(58) Field of Classification Search .................. 310/71, 310/87, 89; 417/410.1, 423.1, 423.3, 423.7, 417/423.14, 360; 174/66, 67, 488, 490; 220/241; 439/536
    See application file for complete search history.

(56) References Cited

U.S. PATENT DOCUMENTS

| | | | |
|---|---|---|---|
| 2,648,286 A | | 8/1953 | Bergh |
| 2,674,194 A | | 4/1954 | Arutunoff |
| 2,885,964 A | * | 5/1959 | Lung ..................... 417/423.3 |
| 2,897,763 A | | 8/1959 | Wright |
| 3,288,074 A | * | 11/1966 | Hall ..................... 415/199.3 |
| 3,375,789 A | * | 4/1968 | Easton ................... 415/199.3 |
| 3,837,767 A | | 9/1974 | Aller |
| 3,952,218 A | * | 4/1976 | Deters ........................ 310/71 |
| 4,019,836 A | * | 4/1977 | Deters ....................... 417/360 |
| 4,128,735 A | * | 12/1978 | Zehren ...................... 174/657 |
| RE30,382 E | | 8/1980 | Mandell |
| 4,523,899 A | | 6/1985 | Ouchi |
| 5,207,562 A | | 5/1993 | Neibrook et al. |
| 5,669,763 A | | 9/1997 | Pryce et al. |
| 5,860,796 A | | 1/1999 | Clausen |
| 5,959,251 A | * | 9/1999 | English et al. ................ 174/66 |
| 6,079,958 A | | 6/2000 | Qandil |
| 6,276,908 B1 | | 8/2001 | Batchelder et al. |
| 6,390,780 B1 | | 5/2002 | Batchelder et al. |

(Continued)

OTHER PUBLICATIONS

Grundfos SQ, SQE Installation and Operating Instructions, Apr. 18, 2002.*

(Continued)

*Primary Examiner*—Karl I Tamai
(74) *Attorney, Agent, or Firm*—Marshall, Gerstein & Borun LLP (57) ABSTRACT

A pump-motor assembly includes a housing and a lead protector sleeve to protect leads disposed along an exterior surface of the housing. The housing and the lead protector sleeve include first and second cooperating snap-fit connection elements, respectively, to secure the lead protector sleeve in position along the exterior surface of the housing via a snap-fit connection. The lead protector sleeve may include a first portion spaced from the exterior surface to form a conduit along the exterior surface to accommodate the leads, and a second portion extending from the first portion to engage the pump-motor housing. The second portion may include a projection or depression to secure the lead protector in position along the exterior surface of the pump-motor assembly via snap-fit interaction with the housing. In one embodiment, the second portion may include a resiliently deformable tab.

12 Claims, 7 Drawing Sheets

U.S. PATENT DOCUMENTS

| | | | |
|---|---|---|---|
| 6,409,485 | B1 | 6/2002 | Ebner |
| 6,571,046 | B1 * | 5/2003 | Hickey et al. ............... 385/134 |
| 6,715,994 | B2 | 4/2004 | Patel et al. |
| 2006/0250754 | A1 * | 11/2006 | Schlosser ................... 361/600 |

OTHER PUBLICATIONS

Redi-Flo3, SQE Environmental Pumps, Installation and Operating Instructions, Feb. 2000.*

Jacuzzi pump repair parts, pp. 165-187, from http://www.font.co.cr/CDCorporativo/bombas/jacuzzi/, dated Oct. 22, 2004.*

Goulds Pumps, ITT Industries, Repair Parts, Model GS (http://www.goulds.com/pdf/R5-25GS.pdf), no date provided.

"SandHandler™ 4" Submersible Pump," 2 & 3 (http://www.jbdpumps.com/catalog/2004/04ws02_03.pdf).

"The Rustler 4" NEMA Submersible Pumps," Myers Pentair Pump Group, 4 pp., Feb. 2001 (http://www.femyers.com/pdf/pdf.ws/ws%20brochure/k3153-20.pdf).

* cited by examiner

PUMP-MOTOR ASSEMBLY LEAD PROTECTOR AND ASSEMBLY METHOD

BACKGROUND OF THE INVENTION

1. Field of the Invention

The present invention relates generally to pump-motor assemblies and, more particularly, to submersible pump-motor assemblies having a lead protector.

2. Brief Description of Related Technology

Submersible pump-motor assemblies for domestic water well and other applications typically include a lead protector to protect the leads, or cabling, running alongside the pump to the motor. Without the lead protector, the leads may be damaged during installation as the pump-motor assembly is lowered into a well. The lead protector may also help prevent damage after installation during subsequent maintenance efforts requiring removal of the assembly from the well. During operation, the leads may require protection in cases where the pump-motor assembly may impact the well casing.

Lead protectors are usually installed during assembly of the pump and motor units. Generally, this timing makes installation more convenient because the lead protector can be attached to the pump housing as the cabling and leads are connected to the motor.

Screw fasteners have generally been used to hold the lead protector in position along the exterior of the pump housing. In one past design, the upper and lower ends of the lead protector were secured to the pump housing via screw fasteners, with the lower end being attached at a point near the motor bracket of the pump unit. Another past design relied on screw fasteners at the upper end of the lead protector, while the lower end was disposed in a slot formed by two arms projecting from the pump housing. In either case, the lead protector provided coverage through essentially the entire length of the pump unit.

Submersible pump-motor assemblies are often not assembled until installation in the field to allow for, among other things, separate transport of large pump and motor units. Unfortunately, assembly in the field has meant that installation of the lead protector has also typically occurred in the field. In such cases, installation of the lead protector may constitute a troublesome, time-consuming, or otherwise problematic phase of the overall installation. In particular, the handling of screw fasteners may be especially troubling when ambient or other conditions at the field site are adverse. More generally, the screw fasteners are often lost when dropped or misplaced in the field. Complications may also arise from parts not manufactured within a tolerance that guarantees alignment of holes for the screw fasteners.

SUMMARY OF THE INVENTION

In accordance with one aspect, a pump-motor assembly includes a housing having an exterior surface and a lead protector sleeve to protect leads disposed along the exterior surface of the housing. The housing and lead protector sleeve include first and second cooperating snap-fit connection elements, respectively, to secure the lead protector sleeve in position along the exterior surface of the housing via a snap-fit connection.

In one embodiment, the first cooperating snap-fit connection element includes a male connection element or a female connection element. The second cooperating snap-fit connection element includes a corresponding male connection element or female connection element to cooperate with the first cooperating snap-fit connection element via the snap-fit connection. The male and female connection elements may include a projection and a matching depression, respectively. Alternatively, the male and female connection elements include a rib and matching groove, respectively. In another alternative embodiment, the male and female connection elements include a tab and a slot, respectively. In this embodiment, a spacing between a pair of retaining fingers extending from the exterior of the housing may define the slot.

In one embodiment, the lead protector sleeve includes a strip having a conduit portion for the leads and a wing portion extending from the conduit portion. The wing portion may include a second cooperating snap-fit connection element. The second cooperating snap-fit connection element may include a resiliently movable tab that pivots between a first position not aligned with adjacent segments of the wing portion to engage the first cooperating snap-fit connection element to lock the lead protector sleeve into position along the exterior surface of the housing, and a second position aligned with the wing portion. The first cooperating snap-fit connection element may include a retaining finger extending from the exterior surface of the housing to define a gap between the retaining finger and the exterior surface in which the wing portion is disposed.

In accordance with another aspect, a lead protector is useful to protect leads to be disposed along an exterior surface of a pump-motor assembly housing. The lead protector includes a first portion to be spaced from the exterior surface of the pump-motor assembly housing to form a conduit along the exterior surface of the pump-motor assembly housing to accommodate the leads. The lead protector also includes a second portion extending from the first portion to engage the pump-motor assembly housing. The second portion includes a projection or a depression to secure the lead protector in position along the exterior surface of the pump-motor assembly housing via snap-fit interaction the pump-motor assembly housing.

In one embodiment, the projection and the depression include a rib and a matching groove, respectively. Alternatively, the projection and the depression include a tab and a slot, respectively. In yet another alternative embodiment, the projection includes a tab that pivots from a rest position not aligned with adjacent segments of the second portion to a displaced position aligned with the second portion. The first and second portions may be integral portions of a strip. The first portion may have a U-shaped cross-section, and the second portion may include a pair of wings extending from the first portion. The second portion may include a projection including a resiliently deformable tab. In this embodiment, the resiliently deformable tab may have a rest position in which the resiliently deformable tab projects inwardly.

In accordance with yet another aspect, a method is useful for assembling a pump-motor assembly. The method includes the steps of sliding a lead protector sleeve along an exterior surface of a housing of the pump-motor assembly, and positioning the lead protector sleeve along the exterior surface to align first and second corresponding snap-fit connection elements of the lead protector sleeve and the housing, respectively. The method further includes the step of establishing a snap-fit connection using the first and second corresponding snap-fit connection elements to lock the lead protector sleeve in position along the exterior surface of the housing.

In one embodiment, either the first corresponding snap-fit connection element or the second corresponding snap-fit connection element includes a resilient tab. The positioning step may include the step of displacing the resilient tab from a rest position. The establishing step may include step of allowing the resilient tab to return to the rest position.

In accordance with a further aspect, a pump-motor assembly includes a housing having an exterior surface and a retaining arm extending from the exterior surface to define a gap between the retaining arm and the exterior surface. The pump-motor assembly further includes a lead protector sleeve disposed in the gap and having a movable tab that engages the retaining arm to secure the lead protector sleeve in position along the exterior surface of the housing.

In one embodiment, the lead protector sleeve includes a conduit portion and a wing portion extending from the conduit portion and disposed in the gap. The wing portion may include the movable tab, and the movable tab may pivot between a first position not aligned with the. adjacent segments of the wing portion for engaging the retaining arm to lock the lead protector sleeve in position along the exterior of the housing and a second position for sliding the lead protector sleeve through the gap. The movable tab may resiliently pivot between the first and second positions. Alternatively, the movable tab may pivot between the first and second positions via plastic deformation.

BRIEF DESCRIPTION OF THE DRAWING FIGURES

For a more complete understanding of the invention, reference should be made to the following detailed description and accompanying drawing wherein.

While the disclosed pump-motor assembly, lead protector, and assembly method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

A pump-motor assembly and assembly method are described that generally avoid the complications arising from the use of screw fasteners to secure a lead protector. Instead, a lead protector is secured via a lock involving snap-fit interaction between corresponding snap-fit connection elements, such as one or more retaining arms of the pump-motor assembly housing, that together provide for convenient assembly and disassembly. In some embodiments, the lead protector has one or more locking tangs, each of which respectively engage one or more of the retaining arms to secure the lead protector in position along the exterior surface of the pump-motor assembly housing. Each locking tang may be capable of either resilient deflection between a rest position and a temporary position or, alternatively, plastic deformation between two rest positions. In either case, the lead protector is conveniently secured in position, as will be described further hereinbelow, without the use of screw fasteners. More generally, the corresponding snap-fit connection elements may have a number of different shapes and, accordingly, a number of different snap-fit connections.

While the disclosed pump-motor assembly, lead protector and assembly method are particularly well suited for, and described in connection with, water well and similar submersible applications, practice of the present invention is not limited to such contexts and applications. The disclosed lead protector may also be useful in other contexts where motor leads or cabling require protection or covering.

Figure 1:
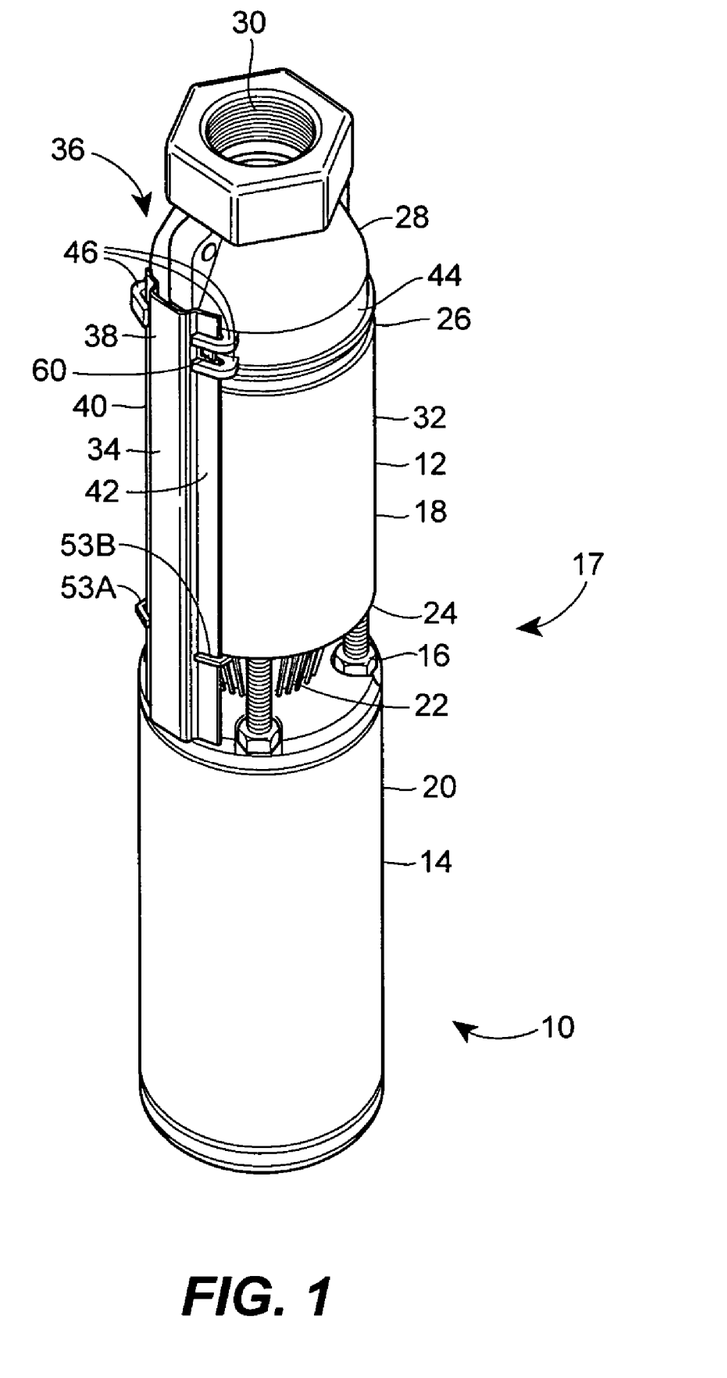
FIG. 1 is a perspective view of a pump-motor assembly having a lead protector in accordance with one embodiment.

With reference to FIG. 1, a pump-motor assembly indicated generally at 10 includes a pump unit 12 and a motor unit 14 connected by a motor bracket 16 of the pump unit 12. The motor bracket 16 includes a number of bolt-nut assemblies and other components, such as a coupling (not shown) connecting respective shafts of the pump unit 12 and the motor unit 14, for coupling the pump unit 12 and the motor unit 14. The pump-motor assembly 10 includes a housing indicated generally at 17, which, in turn, includes a generally tubular pump housing 18 enclosing the pump unit 12 and a motor housing 20 of similar tubular shape enclosing the motor unit 14. The pump housing 18 and the motor housing 20 may have any length and diameter to suit the application requirements (pressure, flow, etc.) and need not have equal dimensions. For instance, the motor housing 20 may have a larger diameter than the pump housing 18.

The motor unit 14 may include a variable-speed motor (not shown) or any other motor suitable for the application. The motor housing 20 encloses the stator, rotor and drive shaft of the motor, the drive shaft having a coupling end (not shown) that extends through a top shaft seal (not shown) and the motor bracket 16 to engage a splined coupling (not shown) of the pump unit 12. The top shaft seal and other aspects of the motor unit 14 and motor housing 20 create a watertight environment for submersible operation.

The pump unit 12 may be a centrifugal, in-line submersible pump such that the pump housing 18 encloses multiple stages of impellers and diffusers (not shown) to meet water head requirements. The impeller/diffuser stack is mounted on a single shaft (not shown) that engages the splined coupling near the motor bracket 16. As a result, the pump-motor assembly 10 has a generally axial configuration, as shown in FIG. 1, with components arranged and disposed along the axis defined by the drive shafts of the motor unit 14 and pump unit 12.

While the present invention is described and shown in connection with pump-motor assemblies having an axial configuration, practice of the present invention is not limited to any pump or motor type, or pump-motor assembly configuration. Generally speaking, other pump-motor assemblies having different pump or motor components arranged in alternative configurations may benefit from the present invention if the electrical connection to the motor unit 14 requires protection.

During operation, fluid is drawn into the pump unit 12 through a screened intake 22 at an intake end 24 of the pump unit 12 near the motor bracket 16. The fluid is produced under increased pressure at a discharge end 26 of the pump unit 12. Located at the discharge end 26, a pump discharge component 28 of the pump-motor assembly 10 defines an output port 30 of the pump unit 12. The output port 30 generally engages piping (not shown) that may form part of a drop pipe (not shown) through which the pressurized fluid flows out of the well. As used herein, the exterior surface of the housing 17 shall be understood to include the exterior surfaces of the pump discharge component 28, the motor bracket 16, the pump housing 18, the motor housing 20, and any other component of the pump-motor assembly 10 having an exterior surface alongside which components related to the electrical connection to the motor unit 14 may be disposed.

Power is supplied to the motor unit 14 via power conductors (not shown) contained in a drop cable (not shown) that may be taped or otherwise secured to the drop pipe. The conductors may include a grounded conductor and two or more insulated lines providing single-phase or three-phase power at any desired voltage and frequency (e.g., 220 or 230 Volts at 50 or 60 Hz, respectively). At the point that the power conductors reach the pump unit 12, the insulation or other covering of the drop cable may, but need not, be stripped, removed or otherwise modified to expose leads (not shown) of the conductors and/or insulated lines. In the interest of clarity and ease in description, the terms "lead" or "leads" will be used herein to refer to, and include, any electrical wiring, cabling, conductor, or other item utilized in the electrical connection to the motor unit 14, and regardless of whether the cabling or power conductors are modified. Thus, the terms "lead" and "leads" are used in a general sense, rather than to imply any particular type or configuration of electrical conductor or wiring, or any component thereof.

Figure 2:
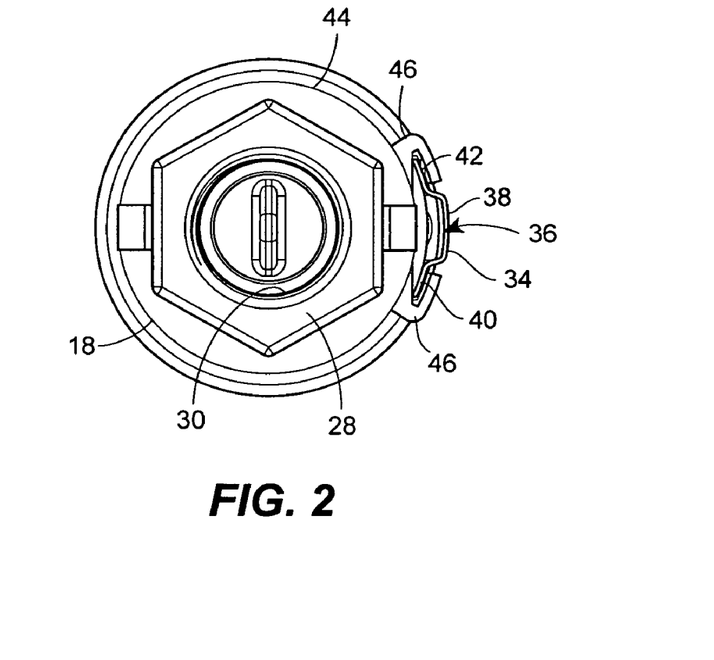
FIG. 2 is a plan view of the pump-motor assembly of FIG. 1.
Figure 3:
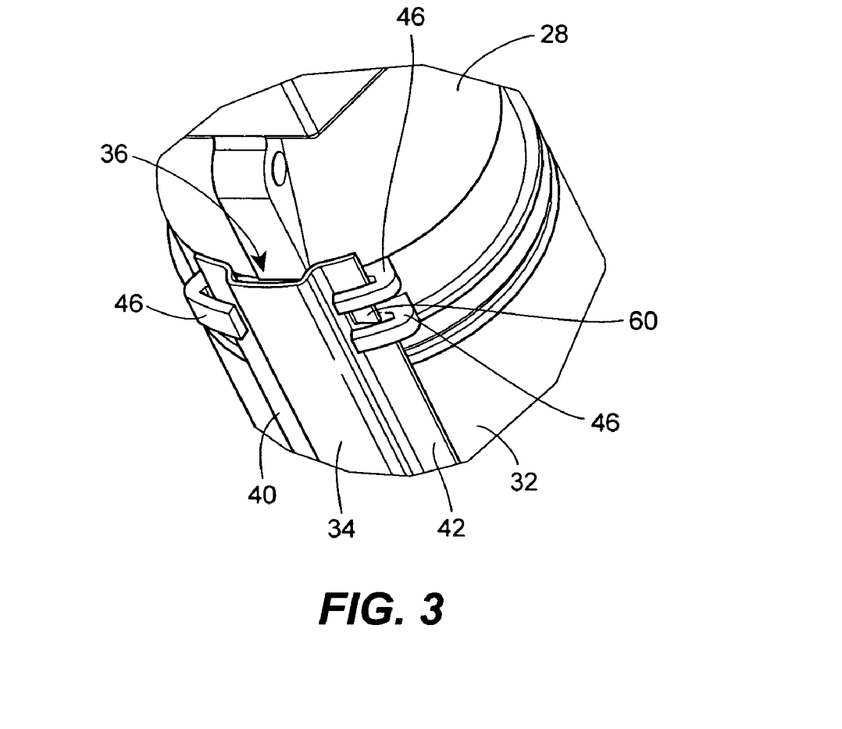
FIG. 3 is a perspective view of a portion of the pump-motor assembly of FIG. 1 showing the lead protector in greater detail.

With reference now to FIGS. 1-3, where elements common to multiple figures are identified with like reference numerals, one embodiment of the disclosed pump-motor assembly 10 is shown. As the leads run alongside an exterior surface 32 of the pump housing 18, a lead protector sleeve 34 generally safeguards the leads from harmful impact or contact with the pump housing 18, the pump discharge component 28, or other system components, such as the well casing. The term "sleeve" is used herein not to imply a tubular structure, and should be understood to include any structure or shape (including cylindrical or tubular shapes) that covers or guards the leads. Similarly, the term "protector" is used herein in a broad sense to include any guard, covering, enclosure or other structure or device that maintains or safeguards the leads. In certain embodiments, the lead protector sleeve 34 does not completely encircle the leads, and instead defines a conduit or spacing indicated generally at 36 between the exterior surface 32 of the pump housing 18 and a center sleeve portion 38 of the lead protector sleeve 34 spaced from the pump housing 18. In the embodiments shown in FIGS. 1-3, the center sleeve portion 38 is U-shaped, and the lead protector sleeve 34 includes two wings 40 and 42 extending away from the center sleeve portion 38 to engage the exterior surface 32 of the pump housing 18. To that end, the two wings 40 and 42 may be curved or shaped to match the curvature of the pump discharge component 28 or, more generally, the pump housing 18 or the housing 17.

In certain embodiments, the lead protector sleeve 34 is formed from an elongated strip either extruded, rolled, stamped, molded, forged, cast, bent, or otherwise shaped to define the center sleeve portion 38 and the corresponding spacing 36. However, the lead protector sleeve 34 need not be formed from a strip. More generally, the lead protector sleeve 34 may take any of a number of conduit-defining shapes having a center sleeve portion and, in some cases, one or more wings or similar portions, as described below. For instance, the lead protector 34 may have omega ($\Omega$) and sigma ($\sigma$) shaped cross-sections. Moreover, the conduit defined by the center sleeve portion 38 of the lead protector sleeve 34 may have approximately tubular, rectangular, circular, triangular or other cross-sectional shapes that define an enclosed spacing for the leads. In these and other embodiments, the exterior surface 32 of the pump housing 18 is not utilized to partially define the conduit or spacing 36, unlike the embodiment shown in FIGS. 1-3. In general, the conduit or spacing 36 may have any shape suitable for carrying the leads to the motor unit 14 and, consequently, the sleeve portion 38 of the lead protector sleeve 34 may have any corresponding shape.

In some embodiments, to secure the lead protector sleeve 34 in position along the exterior surface of the housing 17, a portion of the lead protector sleeve 34 is capable of sliding through one or more gaps or slots defined by the pump discharge component 28 and/or other portions of the housing 17. In the exemplary embodiment of FIGS. 1-4, the wing 42 constitutes the sliding portion. More particularly, in one embodiment, the pump discharge component 28 has an exterior surface 44 that forms part of the housing 17 of the pump-motor assembly 10 and has one or more retaining or guide arms 46 projecting therefrom. Each retaining arm 46 may be any type of projection or other extension from the exterior surface 44 of the pump discharge component 28 such that the retaining arm 46 or other extension has a portion 48 (FIG. 4) spaced from the exterior surface 44 for securely accepting the lead protector sleeve 34.

Figure 4:
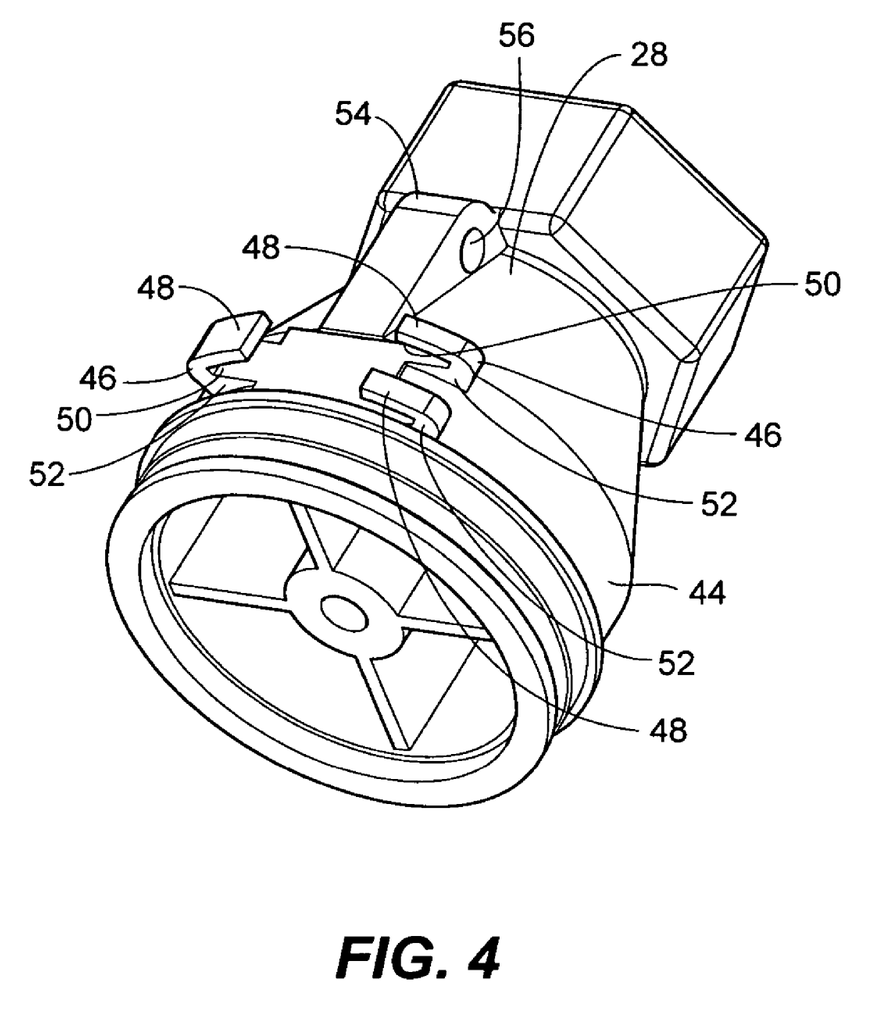
FIG. 4 is a perspective view of a pump discharge component of the pump-motor assembly of FIG. 1 having a plurality of retaining arms in accordance with one embodiment.

As best shown in FIG. 4, each spaced portion 48 defines a respective gap 50 through which one of the wings 40 or 42 slides when the lead protector sleeve 34 is installed or removed. In this fashion, and as will be explained further below, the lead protector sleeve 34 remains disposed in the gaps 50 upon assembly. The gap 50 may also be defined by a non-spaced, or base, portion 52 of the retaining arm 46 disposed along the exterior surface 44 of the pump discharge component 28. As a result of the non-spaced portion 52, the combination of the spaced portion 48 and the non-spaced portion 52 may form a C-shaped or U-shaped structure for the retaining arm 46. More generally, the spaced portion 48 may resemble a finger or finger-like projection or cantilever relative to a base formed by either the non-spaced portion 52, the exterior surface 44 of the pump discharge component 28, or some other portion of the exterior surface of the housing 17. The non-spaced portion 52 may add stability or durability to the retaining arm 46 by increasing the amount of surface area in contact with the exterior surface 44 of the pump discharge component 28. In the exemplary embodiment of FIG. 4, the non-spaced portion 52 ramps up from the exterior surface 44 of the pump discharge component 28 to accommodate the lead protector sleeve 34 during assembly.

The retaining arms 46 may be formed as an integral part of the pump discharge component 28, inasmuch as the pump discharge component 28 may be a molded component. However, in certain embodiments, some or all of the retaining arms 46 are disposed at other points along the housing 17 of the pump-motor assembly 10. For instance, in the embodiment of FIG. 1, two retaining arms 53A and 53B project from the motor bracket 16. The retaining arms 53A and 53B may, but need not, have a different width than the retaining arms 46 described above. In fact, the width of the retaining arms 53A and 53B may correspond with the portion of the motor bracket 16 from which they extend. In this manner, the retaining arms 53A and 53B and the remainder of the motor bracket 16 may constitute integral portions of a molded component (similar to the pump discharge component 28). In other embodiments, one or more retaining arms 46 may alternatively or additionally project or extend from the exterior surface 32 of the pump housing 18. Regardless of their location, the retaining arms 46 may be fixed or attached in any manner known to those skilled in the art and suitable for the environment of use (e.g., the submersible context or application).

Each retaining arm 46 and the respective gap 50 formed thereby generally help to secure the lead protector sleeve 34 to the housing 17. The retaining arm 46 may restrict movement both radially and laterally (relative to the major axis of the pump-motor assembly 10), particularly in embodiments having only a single retaining arm 46. Embodiments having more than one retaining arm 46 may use certain arms for radial movement restriction and others for lateral movement restriction. To that end, the retaining arms 46 may be shaped differently to suit varying purposes. Taken together, however, the retaining arms 46 collectively contribute to form a channel or path having dimensions that allow the lead protector sleeve 34 to slide through the gaps 50 into position along the exterior of the housing 17, while preventing any undesirable, significant movement in, for example, the radial or lateral directions outside of the channel or path.

With continued reference to the exemplary embodiment of FIG. 4, the pump discharge component 28 includes a wedge 54 that protrudes above the exterior surface 44 at a position immediately above where the lead protector sleeve 34 enters the channel or path defined by the retaining arms 46. The wedge 54 has an interior hole 56 through which a rope or cable may be fed to allow the pump-motor assembly 10 to be pulled from the well. The wedge 54 has a radial depth that provides sufficient strength for supporting the weight of the assembly 10, while not protruding to an extent that would impede the sliding of the lead protector 34 along the channel or path during installation.

As shown in FIGS. 1 and 3, one embodiment of the lead protector sleeve 34 includes a movable tang or tab 60 to further limit movement of the lead protector sleeve 34, securing the lead protector sleeve 34 in position along the exterior surface of the housing 17. The tab 60 may be movable in a pivoting sense, or in any other manner that allows the tab 60 to move between a projected, or non-aligned, position and a non-projected, or aligned, position, as described further below. Further, the terms "tang" and "tab" are used herein not to imply any particular shape, such that the tab 60 may be any movable projection from the portion of the lead protector sleeve 34 that slides through the gap 50. In operation, the tab 60 secures the lead protector sleeve 34 in position along the exterior of the housing 17 by limiting movement in the axial direction when in a rest position projecting or diverting from the remainder of the lead protector sleeve 34.

In one embodiment, the tab 60 is movable in a resilient manner involving a spring-like pivot movement from a single, rest position in which the tab 60 is not aligned with those segments of the lead protector sleeve 60 adjacent to (i.e., near) the tab 60. The tab 60 is movable to a temporary position in which the tab 60 is aligned with the adjacent segments of the lead protector sleeve 60, thereby allowing the lead protector sleeve 60 to slide through the respective gap(s) 50 formed by each retaining arm 46. Once the tab 60 (e.g., snaps back) returns to the non-aligned position, the tab 60 engages one or more of the retaining arms 46 to block further sliding through the gap 50 formed thereby. In this manner, the tab 60 acts as a locking tang, or snap-fit connector element, disposed adjacent one or more retaining arms 46, with each such retaining arm 46 also acting as a corresponding snap-fit connector element. The one or more retaining arms 46 engaged by the tab 60 may, but need not, have a reduced width as shown in FIGS. 1 and 3, and will be referred to as a pair of retaining fingers 46 to distinguish them from the one or more other retaining arms 46 not engaged by the tab 60. In embodiments having a pair of retaining fingers 46 for the tab 60, the spacing between the pair of retaining fingers 46 generally corresponds with the width of the tab 60, such that the pair of retaining fingers 46 forms a lock, or latch, preventing further movement in either axial direction.

In an alternative embodiment to that shown in FIG. 1, only a single retaining finger 46 is used with the tab 60. More particularly, upon installation, the retaining finger 46 is disposed above (i.e., closer to the discharge port 30) the tab 60 such that the retaining finger prevents axial movement in the upward direction. Axial movement in the downward direction (i.e., toward the motor unit 14) may, in turn, be prevented with one or more additional tab-retaining finger locking combinations.

The tab 60 need not exhibit spring-like, resilient movement from the non-aligned, rest position. Alternatively, the tab 60 is movable between non-aligned and aligned positions via plastic deformation with either little or no resiliency. In these cases, the tab 60 may be formed from the remainder of the lead protector sleeve 34 by cutting the tab 60 from one of the wings 40, 42, and bending it into the non-aligned rest position either before or after the lead protector sleeve 34 is in position along the exterior of the housing 17. Subsequent pivoting of the tab 60 into the aligned position (and back into the non-aligned position) may similarly be accomplished through manual bending.

The manner in which the lead protector sleeve 34 is installed and disposed in the position shown in FIG. 1 will now be described. The lead protector sleeve 34 is first aligned with the channel or path defined by the gaps 50 of the retaining arms 46. Starting with the end of the lead protector sleeve 34 that will be disposed near the intake end 24 of the pump unit 12, installation proceeds with sliding the lead protector sleeve 34 through the gap 50 between the exterior surface of the housing 17 and the retaining arm 46 extending therefrom. The sliding of the lead protector sleeve 34 through the gap 50 continues such that the movable tab 60 projecting from the lead protector sleeve 34 passes through the gap 50. After the movable tab 60 has passed through the gap 50 (i.e., cleared one of the retaining fingers 46), the movable tab 60 is placed in a rest position that engages the retaining arm 46 to prohibit the lead protector sleeve 34 from sliding out of the gap 50, thereby locking the lead protector sleeve 34 in position along the exterior surface of the housing 17. In embodiments where the movable tab 60 is a resilient tab having a rest position not aligned with the portion of the lead protector sleeve 34 that passes through the gap 50 (e.g., one of the wings 40, 42), the tab 60 is displaced (e.g., depressed) into a temporary position in alignment with the portion of the lead protector sleeve 34 that passes through the gap during the slide into position. In that manner, the tab 60 is capable passing through the gap 50. Then, placing the tab 60 in the rest position involves releasing the tab 60 to allow it to return to the rest position from the temporary position. In this case, the resiliency of the tab 60 returns the tab 60 to its rest, or original, position. In other embodiments where the tab 60 is capable of plastic deformation between multiple stationary positions, placing the tab 60 in the rest position involves bending or displacing it using a screwdriver or other tool. In either case, the lead protector sleeve 34 is disposed in position in the channel and the tab 60 prevents further movement because of contact with one of the retaining fingers 46.

In either case, once in the non-aligned, rest position, the tab 60 prevents any further sliding in either axial direction (e.g., up or down) through the gap 50 defined by the pair of retaining arms 46. In this manner, the combination of the tab 60 and the pair of retaining fingers 46 forms a lock or latch to secure and hold the lead protector sleeve 34 in position along the exterior surface 32 of the pump housing 18 and, more generally, the housing 17 of the pump-motor assembly 10.

The lead protector sleeve 34 may have any number of locking tangs similar to the tab 60. Each locking tang may interact with either one or more retaining fingers 46 of the housing 17. For instance, in one alternative embodiment (not shown), a first locking tang and retaining finger combination may be disposed near the discharge end 26 of the pump unit 12, while a second locking tang and retaining finger combination may be disposed near the intake end 24 of the pump unit 12. The first lock combination may be configured to limit further movement in one axial direction (e.g., up), while the second lock combination may be configured to limit movement in the other axial direction (e.g., down). Alternatively, both locking tangs may limit movement in both axial directions. The retaining finger(s) 46 of the first lock combination may extend or project from the pump discharge component 28 as shown in FIG. 1, while the retaining finger(s) 46 of the second lock combination may extend or project from the pump housing 18 or the motor bracket 16.

Figure 5:
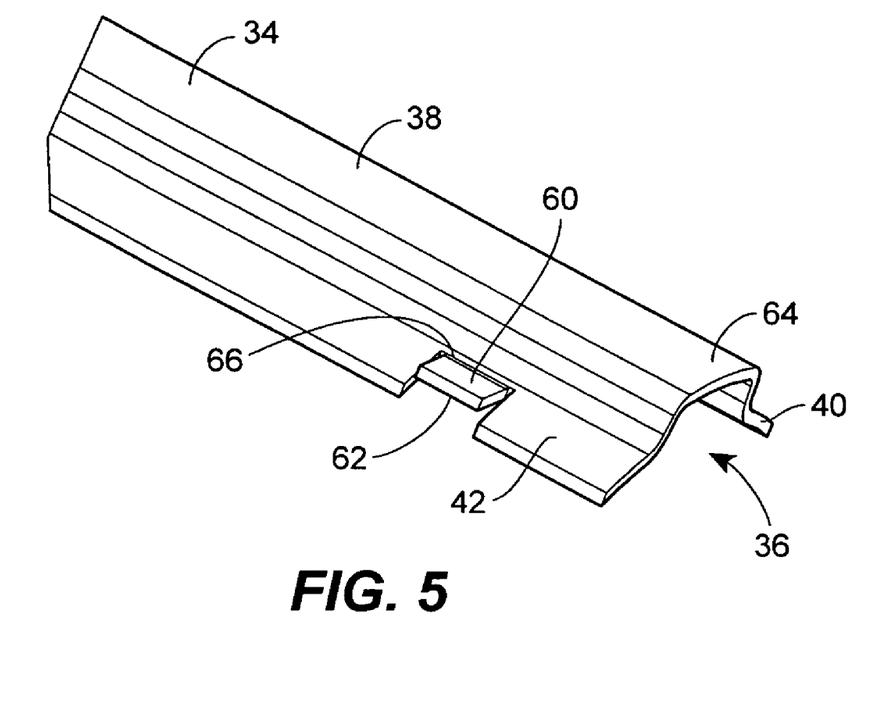
FIG. 5 is a perspective view of a portion of a lead protector in accordance with one embodiment.
Figure 6:
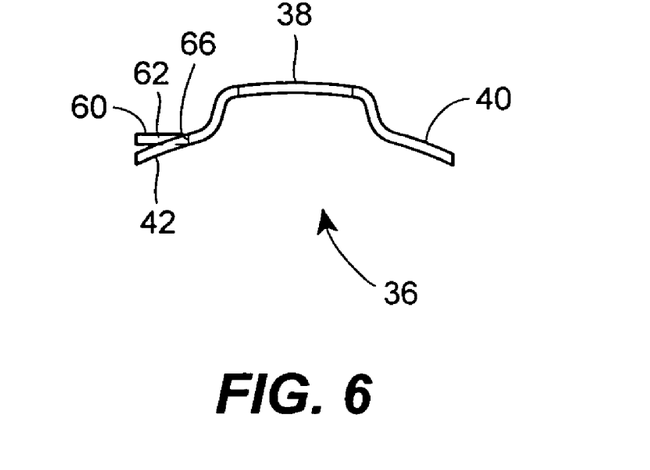
FIG. 6 is plan view of the lead protector of FIG. 5.

As shown in FIGS. 5 and 6, one embodiment of the lead protector sleeve 34 has an upwardly extending lever 62 to form the tab 60 near an end 64 of the lead protector sleeve 34 that may be disposed near the discharge end 26 (FIG. 1) of the pump unit 21 (FIG. 1). Depressing the lever 62 causes it to move about a pivot 66 and into a temporary position aligned with the wing 42. Releasing the lever 62 causes it to snap outwardly back into the rest position shown in FIGS. 5 and 6.

Generally speaking, the tab 60 may be integrally formed from the wing 42 from which it projects. However, the tab 60 may be cut and displaced from the wing 42 in a number of ways. In the embodiments 'shown in FIGS. 5 and 6, the tab 60 has a rest position that is displaced radially outwardly from the wing 42 and the remainder of the pump-motor assembly 10. Moreover, the pivot 66 moves about a longitudinal axis, i.e., an axis parallel to the main axis of the pump-motor assembly 10 defined by the drive shafts (not shown) of the motor unit 14 and pump unit 12.

Figure 7:
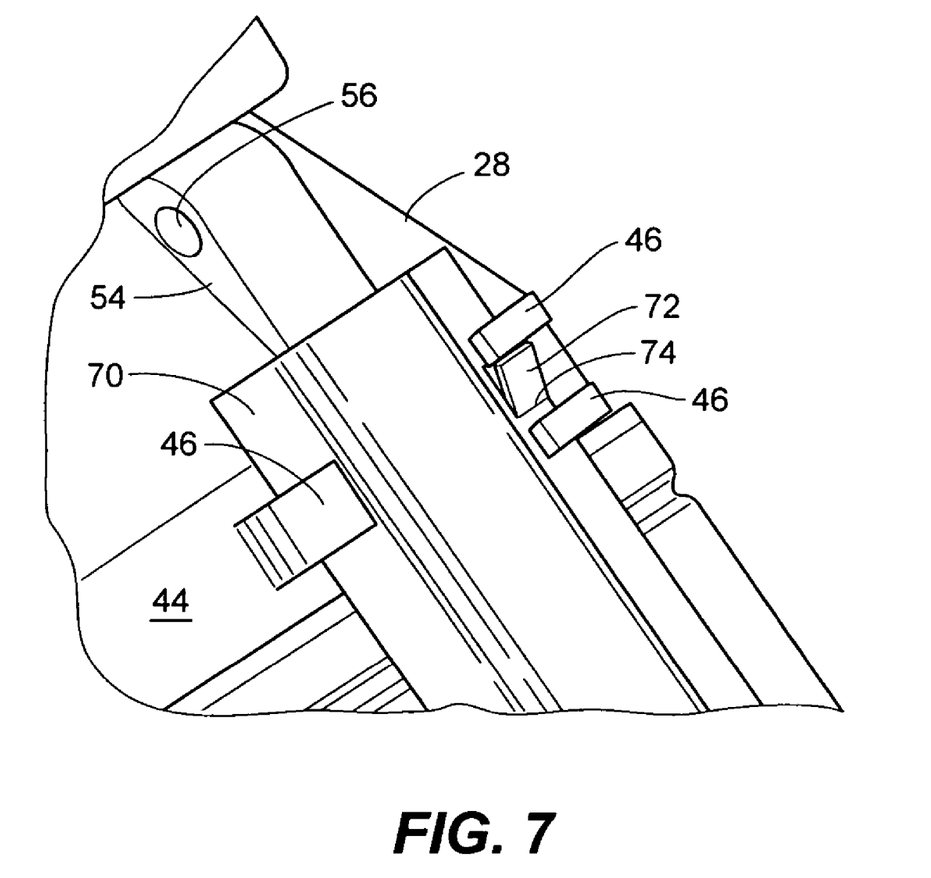
FIG. 7 is a perspective view of a portion of a pump-motor assembly having a lead protector in accordance with an alternative embodiment.
Figure 8:
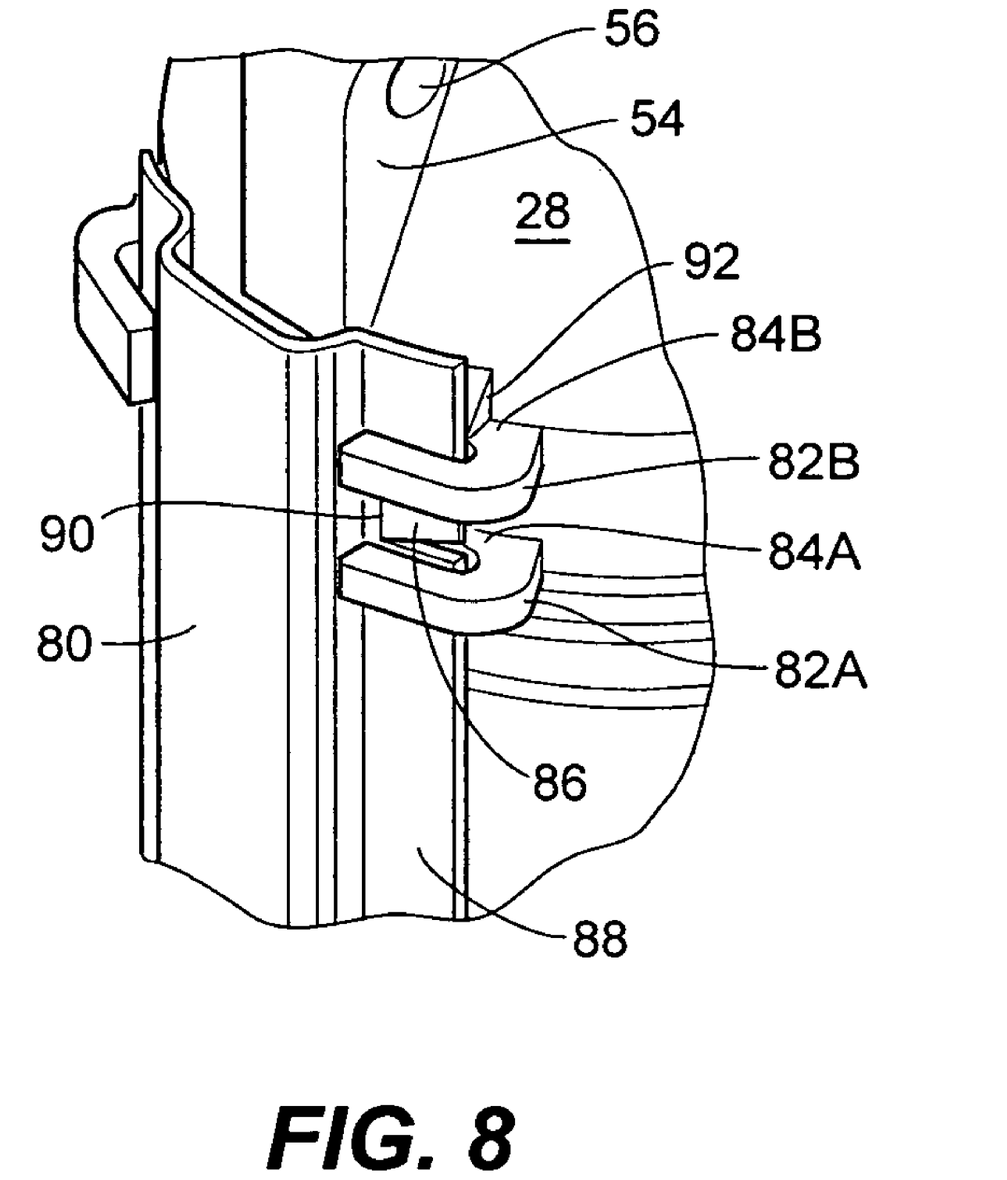
FIG. 8 is a perspective view of a portion of a pump-motor assembly having a lead protector in accordance with a further alternative embodiment.

As shown via the alternative embodiments of FIGS. 7 and 8, the tab 60 of the lead protector sleeve 34 may be oriented such that it projects either inwardly or outwardly and such that it pivots about any axis within the plane of the wing 42. Generally, the tab 60 may have any rest position displaced from the adjacent portions of the lead protector sleeve 34 (e.g., one of the wings 40 and 42). More specifically, in the alternative embodiment of FIG. 7, a lead protector sleeve 70 includes a tab 72 having a rest position that projects outwardly from a lateral pivot axis 74. The tab 72 may be oriented such that the pivot axis 74 is above the tab 72 rather than below the tab, as shown in FIG. 7. In the case of the orientation shown in FIG. 7, depressing the tab 72 during installation may happen indirectly as the lead protector sleeve 70 progresses past the first retaining finger 46 of the pair of retaining fingers 46 forming the lock. As used herein, the terms "depressing" and "displacing" will refer to depressing and displacing the tab both directly and indirectly.

The embodiment of FIG. 7 may rely on the lead protector sleeve 70 resting, or bottoming out, on some feature or element of the pump-motor assembly 10 or the motor bracket 16. Alternatively, the lead protector sleeve 70 may include an additional tab (not shown) having a pivot axis above the tab rather than below it (as shown in FIG. 7), which would prevent further sliding, or axial movement, of the lead protector sleeve 70 after the point at which the tab 72 has cleared the first retaining finger 46. The additional tab may pivot in other directions as well, as will be appreciated in view of the embodiments shown herein.

With reference now to FIG. 8, yet another alternative lead protector sleeve 80 is shown with a pair of retaining fingers 82A and 82B extending or projecting from the pump discharge component 28 or other component of the housing 17. In this embodiment, the retaining fingers 82A and 82B have respective base portions 84A and 84B that provide sufficient clearance for a tab 86 having an inwardly displaced rest position relative to a wing 88 of the lead protector sleeve 80. During installation, the tab 86 is moved about a pivot axis 90 to align the tab 86 with the wing 88. Movement from the rest position shown in FIG. 8 to a displaced position aligned with the wing 88 may be aided by a wedge or ramp 92 added as a part of, or affixed to, the pump discharge component 28. The ramp 92 guides the tab 86 outward as the lead protector sleeve 80 slides into position along the exterior of the housing 17.

The lead protectors 34, 70, and 80 correspond with exemplary embodiments having a tab as either a locking mechanism or a snap-fit connection element. More generally, the lead protector may be locked in position along the exterior of the pump-motor housing using a variety of snap-fit connections, and need not use a stop tab in connection with fingers, arms or other projections from the housing. Any one of a number of conventional snap-fit connections may be used and, accordingly, only a few representative examples will be discussed. Generally, however, the snap-fit connection may include or involve male and female cooperating snap-fit connection elements formed on, or included in, either the housing or the lead protector. In other words, the connection elements may be oriented either way, as desired. In the case of the lead protectors 34, 70, and 80, the tab of the lead protector may be considered a male connection element, while the slot formed by the pair of fingers may be considered the corresponding female connection element.

More generally, the snap-fit connection may include any projection and matching depression or detent, where the projection may have any shape or form, such as a bump. Similarly, the matching or corresponding female connection element may have any shape or form, such as a notch, rib, groove, aperture, or hole. In one embodiment, the projection is resiliently deformable to allow the elements of the snap-fit connection to move and snap into place to form the connection. In other embodiments, the structure or other portion of the component having the depression may also, or alternatively, be resiliently deformable for this purpose.

Figure 9:
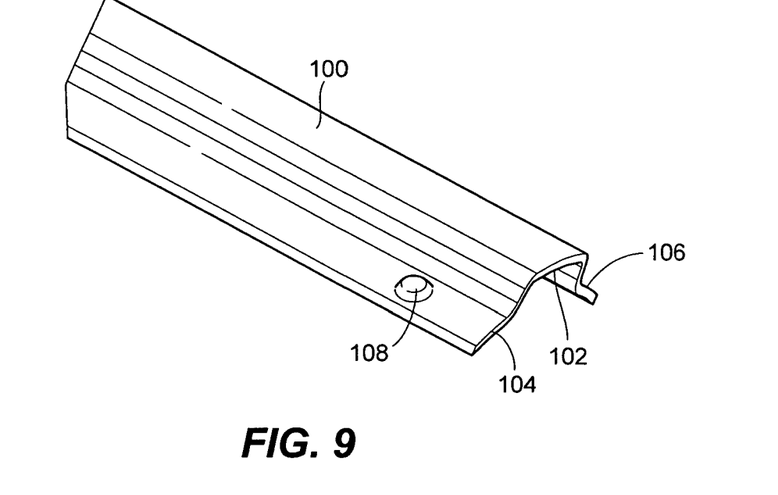
FIG. 9 is a perspective view of a portion of a lead protector in accordance with an alternative snap-fit connection element; and, FIG. 10 is a perspective, exploded view of a portion of a pump-motor assembly having an alternative snap-fit connection.

An exemplary embodiment of one snap-fit connection element is shown in FIG. 9. A lead protector sleeve 100 may have a center sleeve portion 102 and wing portions 104 and 106 in similar fashion to the embodiments described above. For this reason, the lead protector sleeve 100 may engage the pump-motor housing (not shown) in much the same manner as in the embodiments described above. However, instead of a tab, the lead protector sleeve 100 includes a bump 108 having a rounded shape (i.e., circular cross-section). The bump 108 may be sized and shaped to correspond with the slot formed by two retaining fingers projecting from the pump-motor housing. More generally, the bump 108 may have any size or shape to match a corresponding depression or other female snap-fit connection element on or associated with the pump-motor housing. In other embodiments, the lead protector sleeve 100 may have the depression or female element.

Figure 10:
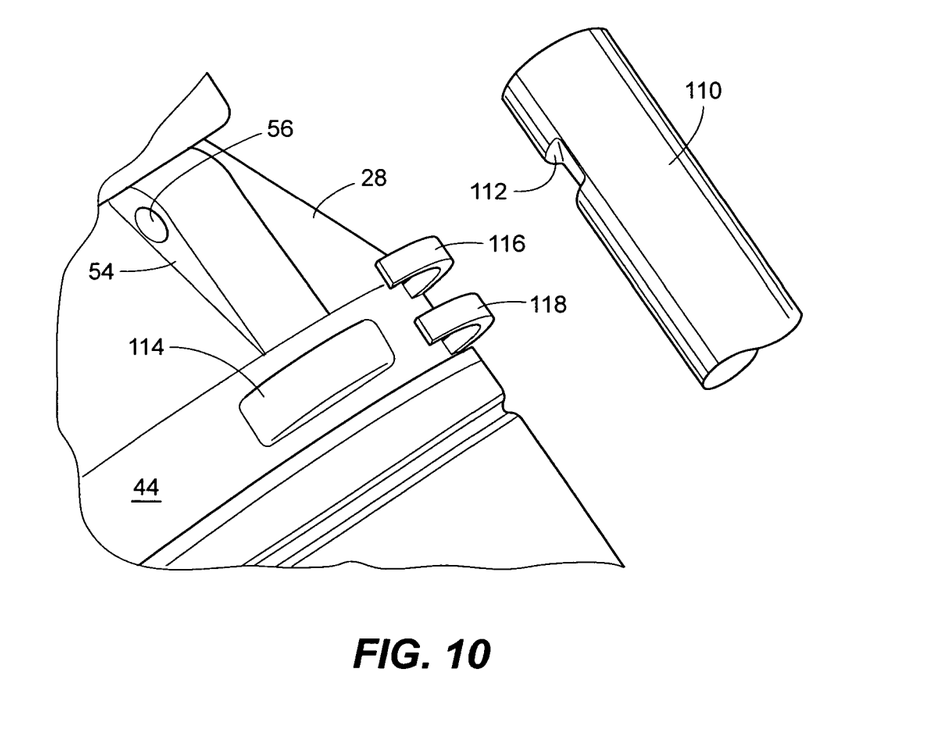

FIG. 10 depicts an alternative snap-fit connection in an embodiment having a tubular lead protector sleeve 110, in which a notch or depression 112 has been formed. A matching or corresponding projection 114 is disposed on the pump-motor housing to lock the sleeve 110 in position. In this case, the pump-motor housing also includes a pair of retaining arms 116 and 118 to restrict radial movement. The projection 114 and retaining arms 116 and 118 project from the exterior surface 44 of the pump discharge component 28, although any other location (or locations) may be used. As discussed above, one or both of the projection 114 and the lead protector sleeve 110 may be resiliently deformable to enable the snap-fit connection. To help slide the snap-fit connection elements into position, the projection 114 may also have tapered edges. More generally, the projection 114 may have a rib shape, as shown in FIG. 10, or any other shape. Similarly, the notch 112 may have a groove shape corresponding to the rib shape of the projection 114, or any other suitable indentation, recess, or receptor shape.

It should be understood that the exemplary embodiments of FIGS. 9 and 10 may be modified by switching the locations of the snap-fit connection elements. In either case, the embodiments of FIGS. 9 and 10 represent only a few of the many possible configurations of an interlocking, or interference, fit to secure the lead protector sleeve in position along the exterior surface of the pump-motor housing.

The motor bracket 16, the pump discharge component 28, and any other components of the housing 17 from which one or more retaining arms 46 project may be made of a number of materials, including various plastics, stainless steel, or brass. One or more of the retaining arms 46 may be made of a different material than the adjacent portion of the housing 17 from which they project. In such cases, and in cases where one or more of the retaining arms 46 is not formed integrally with the portion of the housing 17 from which it projects, the retaining arm 46 may be welded, insert molded, or affixed through other various means of attachment known to those skilled in the art.

The lead protector sleeves described herein may be made of any one of a number of materials, including plastic or stainless steel, and may be formed via molding, extrusion, stamping, or any other method suitable for the material being shaped. The tab 60 may be made from the same or different material as the remainder of the lead protector sleeve. In some embodiments, the tab 60 may be cut from the remainder of the lead protector sleeve, and bent into its rest position either before or after the lead protector sleeve is slid into position in the channel. For instance, the tab 60 may be bent into its rest position using a screwdriver or other tool providing shape-modifying leverage.

To avoid the difficulties arising from the use of screw fasteners and otherwise make assembly, disassembly and other work involving the lead protector sleeve more convenient, the foregoing pump-motor assembly 10, lead protector sleeve 34, and assembly method incorporates a sliding and lock approach to secure the lead protector sleeve 34 in an axial, or longitudinal, position along the exterior surface of the pump-motor assembly housing 17. The housing 17 has a number of retaining arms 46 that define a channel or guide path to further secure the lead protector sleeve 34 in position and prevent movement in other directions. Moreover, the retaining arms 46 are spaced from the exterior surface of the housing 17 to define the channel or path that guides the sleeve as it slides into position. To lock the sleeve 34 in position, the sleeve 34 has a locking tang or tongue formed from the tab 60 that is depressed or otherwise displaced during installation to allow the tab 60 to slide past one or more of the retaining arms 46. After clearing an arm 46, and with the sleeve 34 in position, the tab 60 is returned to its original, rest position to lock the sleeve 34 in position. The tab 60 may be disposed between two retaining arms 46 to limit movement of the sleeve 34 in either longitudinal direction.

The foregoing description is given for clearness of understanding only, and no unnecessary limitations should be understood therefrom, as modifications within the scope of the invention may be apparent to those having ordinary skill in the art.

What is claimed is:

1. A pump-motor assembly comprising:
 a housing having an exterior surface and a retaining arm extending from the exterior surface to define a gap between the retaining arm and the exterior surface of the housing; and,
 a lead protector sleeve disposed in the gap and having a movable tab that engages the retaining arm to secure the lead protector sleeve in position along the exterior surface of the housing;
 wherein the lead protector sleeve comprises a strip having a first portion that defines a conduit and a second portion defining a wing that is disposed in the gap; and
 wherein the second portion further comprises the movable tab that pivots between a first position spaced from the wing for engaging the retaining arm to lock the lead protector sleeve in position along the exterior of the housing and a second position for sliding the lead protector sleeve through the gap.

2. The pump-motor assembly of claim 1, wherein the first portion of the lead protector sleeve has a U-shaped cross-section.

3. The pump-motor assembly of claim 1, wherein the second portion comprises a wing extending from the first portion to meet the exterior surface of the housing such that the wing is disposed in the gap.

4. The pump-motor assembly of claim 1, wherein the retaining arm is one of a plurality of retaining arms defining respective gaps in which the lead protector sleeve is disposed.

5. The pump-motor assembly of claim 4, wherein the plurality of retaining arms includes a pair of retaining fingers positioned on the exterior surface of the housing such that the movable tab is locked between the pair of fingers when in the first position.

6. A lead protector to protect leads to be disposed along an exterior surface of a pump-motor assembly housing, the housing having a retaining arm extending from the exterior surface to define a gap between the retaining arm and the exterior surface of the housing, the lead protector comprising:
 a sleeve portion to define a conduit along the exterior surface of the pump-motor assembly housing to accommodate the leads;
 a wing extending from the sleeve portion to engage the pump-motor assembly housing; and,
 a movable projection having a rest position not aligned with the wing to secure the lead protector in position along the exterior surface of the pump-motor assembly housing, wherein the movable projection pivots between a first position spaced from the wing for engaging the retaining arm to lock the lead protector in position along the exterior of the housing and a second position for sliding the lead protector through the gap.

7. The lead protector of claim 6, wherein the movable projection comprises a tab that pivots from the rest position to a displaced position in alignment with the wing.

8. The lead protector of claim 7, wherein the movable projection forms a locking tang that resiliently moves back to the rest position when released from the displaced position once the lead protector is in position along the exterior surface of the pump-motor assembly housing.

9. The lead protector of claim 6, wherein the sleeve portion, the wing and the movable projection are integral portions of a strip.

10. The lead protector of claim 6, wherein the sleeve portion has a U-shaped cross-section.

11. The lead protector of claim 6, wherein the movable projection is capable of plastic deformation into the rest position.

12. The lead protector of claim 6, wherein the rest position of the movable projection is inwardly displaced relative to the wing.

* * * * *